US011525800B2

(12) United States Patent
Sbircea

(10) Patent No.: US 11,525,800 B2
(45) Date of Patent: Dec. 13, 2022

(54) BIOSENSOR FOR MEASURING AN ANALYTE CONCENTRATION

(71) Applicant: Minela Abagiu, Timisoara (RO)

(72) Inventor: Dan-Tiberiu Sbircea, Timisoara (RO)

(73) Assignee: Minela Abagiu, Timisoara (RO)

( * ) Notice: Subject to any disclaimer, the term of this patent is extended or adjusted under 35 U.S.C. 154(b) by 152 days.

(21) Appl. No.: 16/616,086

(22) PCT Filed: May 28, 2018

(86) PCT No.: PCT/EP2018/063941
§ 371 (c)(1),
(2) Date: Nov. 22, 2019

(87) PCT Pub. No.: WO2018/215667
PCT Pub. Date: Nov. 29, 2018

(65) Prior Publication Data
US 2020/0150076 A1    May 14, 2020

(30) Foreign Application Priority Data
May 26, 2017 (EP) .................................... 17173115

(51) Int. Cl.
*G01N 27/333* (2006.01)
*G01N 27/414* (2006.01)
(52) U.S. Cl.
CPC ..... *G01N 27/3335* (2013.01); *G01N 27/4145* (2013.01)
(58) Field of Classification Search
None
See application file for complete search history.

(56) References Cited

U.S. PATENT DOCUMENTS 6,582,971 B1   6/2003   Singh et al.

OTHER PUBLICATIONS

I. Petsagkourakis, et al., "Structurally-driven Enhancement of Thermoelectric Properties within Pol(3,4-ethylenedioxythiophene) thin Films", Scientific Reports, 6(1): p. 1-8, Jul. 2016.*
(Continued)

*Primary Examiner* — J. Christopher Ball
(74) *Attorney, Agent, or Firm* — The Webb Law Firm

(57) ABSTRACT

The present patent disclosure concerns a sensor device comprising a sensor electrode for measuring an analyte concentration in an aqueous solution and a method of preparing a sensor electrode, wherein the sensor electrode comprises a substrate having conductive means, a polymer mixture deposited on the sensor electrode adjacent to and/or in contact with the conductive means, wherein the polymer mixture comprises a semiconducting polymer comprised of monomeric units comprising one or more aromatic, preferably thiophene, moieties along a backbone chain and at least two polar side chains covalently bonded to the backbone chain, wherein the semiconducting polymer has an electron and/or hole mobility of at least $1\times10^{-2}$ cm$^2$V$^{-1}$s$^{-1}$, preferably at least $1\times10^{-1}$ cm$^2$V$^{-1}$s$^{-1}$, and wherein the polymer mixture further comprises a hydrophilic polymer comprised of monomeric units comprising one or more carbon-carbon bonds and one or more of hydroxyl, ester, carbonyl or amide moieties, wherein the semiconducting polymer to hydrophilic polymer weight ratio ranges from 1:100 to 1:1, wherein the hydrophilic polymer is cross-linked with a mole ratio of cross-linked hydrophilic polymer monomer units to non cross-linked hydrophilic polymer ranging from 1 to 25%.

14 Claims, 13 Drawing Sheets

(56) References Cited

OTHER PUBLICATIONS

Bolto et al., "Crosslinked poly(vinyl alcohol) membranes", Progress in Polymer Science, 2009, pp. 969-981, vol. 34.
Giovannitti et al., "Controlling the mode of operation of organic transistors through side-chain engineering", Proceedings of the National Academy of Sciences, Oct. 2016, pp. 12017-12022, vol. 113:43.
Ho et al., Amperometric detection of morphine based on poly(3,4-ethylenedioxythiophene) immobilized molecularly imprinted polymer particles prepared by precipitation polymerization, Analytica Chimica Acta, 2005, pp. 90-96, vol. 542.
Malitesta et al., "MIP sensors—the electrochemical approach", Analytical and Bioanalytical Chemistry, 2012, pp. 1827-1846, vol. 402.
Sharma et al., "Electrochemically synthesized polymers in molecular imprinting for chemical sensing", Analytical and Bioanalytical Chemistry, 2012, pp. 3177-3204, vol. 402.

\* cited by examiner

BIOSENSOR FOR MEASURING AN ANALYTE CONCENTRATION

CROSS-REFERENCE TO RELATED APPLICATIONS

This application is the United States national phase of International Application No. PCT/EP2018/063941 filed May 28, 2018, and claims priority to European Patent Application No. 17173115.1 filed May 26, 2017, the disclosures of which are hereby incorporated by reference in their entirety.

FIELD OF THE INVENTION

The present patent disclosure concerns a method of preparing a sensor electrode for measuring an analyte concentration in an aqueous solution, a sensor electrode for measuring an analyte concentration in an aqueous solution, method of measuring an analyte concentration and a sensor apparatus for measuring an analyte concentration in an aqueous solution.

BACKGROUND OF THE INVENTION

Electrochemical biotransducers are a type of biosensor that contain a selective material or component that selectively reacts with a target analyte (e.g. blood glucose) and outputs a signal indicative of the target analyte concentration. Electrochemical biotransducers generally use electrodes onto which the selective material, often a sensitive biological material such as a protein molecule, is disposed. This protein molecule may for instance be an antibody or an enzyme, depending on the target analyte, and the protein then selectively reacts with the target analyte present in an electrolyte that is in contact with the electrode. The sensitive biological elements such as enzymes and antibodies are used due to their selectivity towards certain components.

In such a device, generally a voltage is applied to the sensor electrode with the active material, the so called working electrode, with respect to a reference electrode which is in contact with the electrolyte. When a voltage is applied to the working electrode, a current can be measured between the working electrode and a so called counter electrode, often a metallic grid, in laboratory conditions generally a platina grid. The measured current will depend on the amount of reactant reacting at the working electrode, and thus the measured current, when calibrated, indicates the concentration of reactant in the solution.

The sensor electrodes of these devices, however, require a specific enzyme or antibody is needed in order to provide sensitivity for the specific analyte.

SUMMARY OF THE INVENTION

It is therefore an object of the present patent disclosure to provide for a sensor electrode and method of sensing wherein more generic materials may be used with which an analyte is sensed.

To this end, according to a first aspect, the present patent disclosure concerns a method of preparing a sensor electrode for measuring an analyte concentration in an aqueous solution, the method comprising:
a) providing a mixture comprising:
   semiconducting polymer comprised of monomeric units comprising one or more aromatic, preferably thiophene, moieties along a backbone chain and at least two covalently bonded polar side chains, wherein the semiconducting polymer has an electron and/or hole mobility of at least $1\times10^{-2}$ cm$^2$V$^{-1}$s$^{-1}$, preferably at least $1\times10^{-1}$ cm$^1$V$^{-1}$s$^{-1}$,
   hydrophilic polymer comprised of monomeric units comprising one or more carbon-carbon bonds and one or more of hydroxyl, ester, carbonyl or amide moieties,
   wherein the weight ratio of semiconducting polymer to hydrophilic polymer ranges from 1:100 to 1:1, preferably 1:20 to 1:2, most preferably about 1:4;
b) dissolving the mixture of step a) in a polar aprotic solvent, wherein preferably the volume of solvent ranges from 0.1 to 1 liter per gram of semiconducting polymer, thereby forming a dissolved polymeric mixture;
c) adding a cross-linking agent to the mixture of step b), preferably in a weight percentage of 1 to 25 wt %, based on the weight of hydrophilic polymer of step a), wherein the addition of the cross-linking agent results in the cross-linking of the hydrophilic polymer by reacting with the hydroxyl, ester, carbonyl or amide moieties;
d) adding of the analyte to the cross-linked mixture of step c) in a weight percentage of 1 to 2500 wt %, based on the weight of the semiconducting polymer of step a);
e) allowing a mixture to form comprising preferential sites for the analyte formed by the semiconducting polymer and the cross-linked hydrophilic polymer;
f) depositing the cross-linked mixture of step d) onto a solid substrate, the substrate comprising conductive means for applying a voltage to the deposited cross-linked mixture; and
g) drying the mixture deposited on the solid substrate of step e), thereby forming the sensor electrode.

The semiconducting polymer and cross-linked hydrophilic polymer form a mixture that can form a hydrogel when placed in an aqueous environment. The analyte may then diffuse into and out of the hydrogel. Measurements using the sensor electrodes prepared with this method show a high sensitivity towards various analytes. When the analyte moves in and out of the polymer mixture, the electrical properties of the semiconducting polymer change such that a change in current may be measured compared to an analyte free environment for the sensor electrode, when the sensor electrode is placed in a suitable electrochemical measurement environment, as described below.

The analytes are preferably organic analytes that are water soluble. This may aid the transport into and out of the hydrogel formed by the polymer mixture. In an embodiment, the analyte comprises one of fatty alcohols, aromatic organic compounds, amino acids, peptides, proteins, amine hormones and steroid hormones. In general, the analyte preferably comprises at least 6 carbon moieties and a hydroxyl group. Such analytes describe organic analytes present in biological material. The moieties/groups may provide bonding sites for instance comprising hydrogen bonds—e.g. with the hydroxyl groups—and pi-stacking bonds—e.g. by the double carbon bond. The at least one double carbon bond may be part of aromatic rings. In an embodiment, the analyte is one of: 10-undecen-1-ol, (−1),1′-bi-2-naphtol, IKVAV-OCys laminin peptide, and cortisol.

The amount of solvent of step b) is chosen in order to allow for the polymer mixture of step a) to dissolve. In an embodiment, the solvent is dimethylformamide (DMF) having a chemical formula $(CH_3)_2NC(O)H$, which is known for aiding in the formation of hydrogels. In another embodiment, the solvent is N-methyl-2-pyrrolidone (NMP) having similar properties as DMF.

The amount of analyte in step d, 4-2500 wt %, in terms of analyte to semiconducting polymer weight ratio ranges from 1:25 (4 wt %) to 25:1 (2500 wt %). Preferably, the amount of analyte added in step d is about 100 wt % based on the weight of the semiconducting polymer, or in other words a 1 to 1 ratio between weight the analyte and the weight of the semiconducting polymer. In general these weight ratios provide a sensor electrode having sufficient preferential sites for the analyte.

The step e) of allowing a mixture to form is optional; this is incorporated merely to clarify that the preferential sites for the analyte form within the polymer mixture, which will happen automatically.

The cross-linked mixture may be deposited directly onto the electrical means or there may be an insulating layer deposited in between. In the latter configuration, an electric field in the deposited cross-linked polymer mixture may be controlled indirectly, i.e. by an applied gating voltage.

According to an embodiment, the semiconducting polymer is one of:
poly[3,3'-bis(OR)-2,2'-bithiophene-thienothiophene] (bithiophene-thienothiophene, or "g2T-TT");
poly[N,N'-bis(R)-3,4,9,10-perylene diimide-1,7-diyl-alt-2-(3,3'-di-(OR)-[2,2'-bithiophen]-5-yl)-thieno[3,2-b]thiophene-2,6-diyl] (naphthalene diimide-bithiophene or "NDI-g2T");
poly[(2,5-bis(R)-6-(thiophen-2,5-yl)pyrrolo[3,4-c]pyrrole-1,4(2H,5H)-dione-diyl-alt-3,6-bis-2-(3,3'-di-(OR)-[2,2'-bithiophen]-5-yl)-thieno[3,2-b]thiophene-2,6-diyl] (diketopyrrolopyrrole-bithiophene or "DPP-g2T"); and
poly[(E)-4,4'-bis(R)-[6,6'-bithieno[3,2-b]pyrrolylidene]-5,5' (4H,4'H)-dione-2,2'-diyl-alt-2-(3,3'-di-(OR)-[2,2'-bithiophen]-5-yl)-thieno[3,2-b]thiophene-2,6-diyl] (isoindigo-bithiophene or "isoindigo-g2T" }, wherein R indicates the ion conducting side chains being methoxy-terminated poly- or oligo-ethylene glycol chains comprising at least 3 ethylene glycol moieties and preferably less than 10 ethylene glycol moieties. These semiconducting polymers have favorable properties with respect to the preparing of the sensor electrode and sensing of the analyte in a solution by the sensor electrode, as will be described in further detail below.

According to a preferred embodiment, the semiconducting polymer is poly[3,3'-Bis(2-(2-(2-methoxyethoxy)ethoxy)ethoxy)-2,2'-bithiophene-thienothiophene]. This embodiment of g2T-TT has a hole mobility of about 1 $cm^2/(Vs)$, and have a highest occupied molecular orbital (HOMO) level of about 4.4 to 5 eV vs. vacuum. Such a HOMO level gives a working voltage that is relatively close to the standard hydrogen potential, since this avoids unwanted electrochemical reactions in the electrolyte and/or the polymer mixture of the sensor electrode.

According to a further embodiment, the hydrophilic polymer is at least one of polyvinyl alcohol, polyacrylamide, polyacrylic acid, polyethylene glycol, polyoxazoline and polyvinylpyrrolidone.

According to yet another embedment, the monomeric units of the hydrophilic polymer comprise one or more hydroxyl groups, wherein the amount of cross-linking agent is added in order to provide a molar cross-linking ratio ranging from 1 to 25% with respect to hydroxyl groups of the hydrophilic polymer, preferably the cross-linking ratio is about 10%.

According to a further embodiment, the hydrophilic polymer is polyvinyl alcohol.

According to a further embedment, the cross-linking agent is an organic acid anhydride, wherein the addition of the organic acid anhydride results in the cross-linking of the hydrophilic polymer by reacting with the hydroxyl groups.

According to a preferred embodiment, the organic acid anhydride is maleic anhydride.

Preferably, the amount of cross linking agent results in a cross linking ratio of 1 to 25%, preferably about 10%. When the cross-linking agent is maleic anhydride (MA), and the hydrophilic polymer is poly-vinyl alcohol, to obtain a 10% molar cross-linking ratio about 10 wt % of MA with respect to the PVA is added in step c). This since the molar weight of a PVA monomer unit (44 g/mol of monomer), comprising one hydroxyl group, is approximately half of the molar weight of maleic anhydride (97 g/mol), and since every maleic anhydride molecule reacts with two hydroxyl groups. To obtain a cross-linking ratio of 1 to 25% therefore, 1 to 25 wt % of MA with respect to PVA is required. It will be understood that other weight percentages for other cross-linking agents will be needed to obtain the 1-25% molar cross-linking ratio of the hydrophilic polymer, also depending on the used hydrophilic polymer.

According to a further embodiment, the method further comprises, after step d):
reducing a volume of the cross-linked mixture by at least 50% by removing the polar aprotic solvent; and
adding a further organic solvent to the reduced cross-linked mixture, wherein the further organic solvent has a boiling point that is lower than the boiling point of the polar aprotic solvent, wherein the further solvent has a boiling point lower than 100° C., preferably lower than 80° C. Preferably, the further solvent is chloroform.

According to a further embodiment, step b) comprises stirring the mixture at elevated temperature of at least 60° C. under a substantially oxygen free environment.

According to another embodiment, step c) comprises stirring the mixture at elevated temperature of at least 60° C., preferably about 80° C., under a substantially oxygen free environment.

According to yet another embodiment, the step d) comprises stirring the mixture at elevated temperature of at least 35° C. and sonication of the mixture.

In an embodiment, the method further comprises, after step g), step h) of substantially removing the analyte from the deposited mixture. Since the analyte is not covalently bonded, it can be removed in order to prepare the electrode for calibration and/or measurements. The analyte may be removed by washing with an (aqueous) solvent, or electrochemically as described below or in any other suitable way.

In an embodiment, the conductive means of the substrate is a conductive layer onto which the cross-linked mixture is deposited. In this way, a voltage may be applied directly to the deposited cross-linked mixture, and a conducting connection with the deposited polymer mixture may be provided.

In a preferred embodiment, the substantial removing of the analyte from the deposited mixture comprises placing the sensor electrode in an aqueous electrolyte solution, and applying a voltage of at least 0.5 V to the conducting substrate, wherein the voltage is given with respect to a Ag/AgCl reference electrode.

In another embodiment, the conductive means of the solid substrate comprises a source and a drain contact, wherein the source and drain contacts are distanced from each other, wherein the source and drain are both in contact with the deposited cross-linked mixture thereby forming a semiconducting channel between the source and drain contacts, wherein the conductive means preferably further comprise a gate electrode configured to apply an electric field extending at least partially into the semiconducting channel. In this way, the sensor electrode is used in an organic electrochemical transistor setup.

According to a second aspect, the present patent disclosure provides a sensor electrode obtainable by the methods disclosed above.

The sensor electrode comprises a substrate having conductive means, a polymer mixture deposited on the sensor electrode adjacent to and/or in contact with the conductive means, wherein the polymer mixture comprises a semiconducting polymer comprised of monomeric units comprising one or more thiophene moieties along a backbone chain and at least two polar side chains covalently bonded to the backbone chain, wherein the semiconducting polymer has an electron and/or hole mobility of at least $1\times10^{-2}$ cm$^2$V$^{-1}$s$^{-1}$, preferably at least $1\times10^{-1}$ cm$^2$V$^{-1}$s$^{-1}$, and wherein the polymer mixture further comprises a hydrophilic polymer comprised of monomeric units comprising one or more carbon-carbon bonds and one or more of hydroxyl, ester, carbonyl or amide moieties, wherein the semiconducting polymer to hydrophilic polymer weight ratio ranges from 1 to 100 to 1 to 1, wherein the hydrophilic polymer is cross-linked with a mole ratio of cross-linked hydrophilic polymer monomer units to non cross-linked hydrophilic polymer ranging from 1 to 25%.

Further modifications and/or additions to the sensor electrode may be performed according to the above noted method steps and other steps or features described in the present patent disclosure.

According to a third aspect, the present patent disclosure provides a method of measuring an analyte concentration in an aqueous solution using the sensor electrode obtainable by the method described above, wherein the method comprises:
  placing the sensor electrode in contact with an aqueous solution comprising the analyte;
  applying one or more voltages to the sensor electrode with respect to a further electrode;
  measuring one or more currents through the sensor electrode respectively at the applied one or more voltages;
  comparing the one or more currents to a reference current, wherein the reference current is a current measured at the respective voltage for the electrolyte substantially devoid of analyte;
  calculating the analyte concentration based on the comparison of the current with the reference current.

According to an embodiment, the further electrode is a reference electrode in contact with the electrolyte, wherein the current is measured between the sensor electrode and a counter electrode in contact with the electrolyte, wherein preferably cyclic voltammetry is used to apply the one or more voltages.

In an embodiment, the aqueous solution preferably comprises about 0.1 M NaCl. Such a solution (or electrolyte) is a model for ionic strength in, for instance, humans.

According to a fourth aspect, there is provided a sensor apparatus for measuring an analyte concentration in an aqueous solution, the sensor apparatus comprising:
  a holder for holding the aqueous solution;
  a sensor electrode according to the above aspects, wherein the sensor apparatus is configured to place the sensor electrode in contact with the aqueous solution;
  a further electrode configured to be in contact with the aqueous solution and in electrical contact with the sensor electrode; and
  electronics configured to apply a voltage to the sensor electrode and to measure a corresponding current between the sensor electrode and the further electrode.

According to an embodiment, the sensor device further comprises a reference electrode in contact with the aqueous solution and in electrical contact with the electronics, wherein the electronics are configured to apply the voltage to the sensor electrode relative to a reference voltage of the reference electrode.

According to another embodiment, the electronics are configured to apply a voltage difference to the source and drain contacts, and further configured to measure a drain current between the source and drain contacts.

Further aspects of the present patent disclosure are described by the dependent claims. The features from the dependent claims, features of any of the independent claims and any features of the other dependent claims may be combined as considered appropriate to the person of ordinary skill in the art, and not only in the particular combinations as defined by the claims.

BRIEF DESCRIPTION OF THE DRAWINGS

The accompanying drawings are used to illustrate presently preferred non-limiting exemplary embodiments of methods and devices of the present patent disclosure. The above and other advantages of the features and objects of the present patent disclosure will become more apparent and the present patent disclosure will be better understood from the following detailed description when read in conjunction with the accompanying drawings, in which.

DETAILED DESCRIPTION OF THE INVENTION

Figure 1:
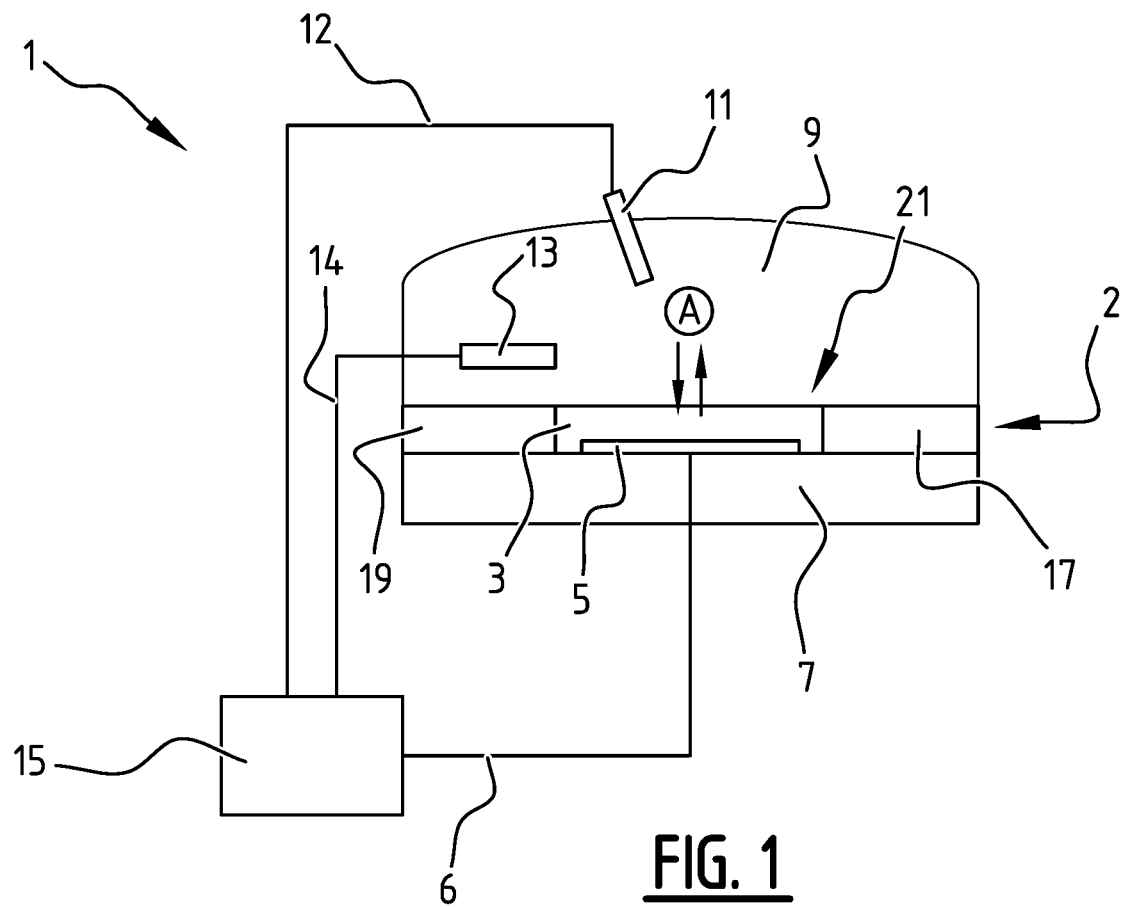
FIG. 1 schematically illustrates a cross-sectional view of the sensor electrode in a sensor device according to embodiments.

FIG. 1 shows an embodiment of a sensor device 1 for performing electrochemical measurements of a concentration of an analyte A in an aqueous electrolyte 9. The sensor device 1 comprises a sensor electrode 2, comprising a substrate 7, for instance a glass substrate. A conducting layer 5, for instance an indium tin oxide (ITO) layer, is deposited onto the substrate 7. A sensing layer 3, formed of a cross-linked polymer mixture comprising the semiconducting polymer and cross-linked hydrophilic polymer described above and below, is deposited onto the substrate 7 at the side thereof comprising the conducting layer 5. In the present embodiment, the sensing layer 3 is deposited in groove 21, formed between side elements 17 and 19 of the substrate 7. The sensing layer may also instead cover a flat surface of the substrate 7, wherein the conducting layer extends across the flat surface.

The sensor device 1 further includes an electronic device 15. The conducting layer 5 is in electrical contact via connection 6 to the electronic device 15. The electronic device 15 may be embodied as a potentiostat, galvanostat, a combination thereof, or any device suitable for performing electrochemical measurements in a two electrode, three electrode and/or four electrode setup. In the embodiment of FIG. 1, the sensor device 1 is in a three electrode configuration. In this configuration, the electronic device 15 measures and/or applies a voltage difference between the conducting layer 5 and a reference electrode 11. The reference electrode 11 may for instance be a silver chloride (Ag/AgCl) reference electrode, for instance having a constant potential of about 2 V (e.g. 0.197 V for sat. KCl) against the standard hydrogen potential ($E^0$, 0 V). A current may be measured and/or applied between the sensing electrode and a counter electrode 13, which is connected to the electronic device 15 via connection 14.

The reference electrode 11 is in contact with the electrolyte 9, and is in electrical contact via connection 12 with the electronic device 15. The counter electrode is furthermore in contact with the electrolyte, at which electrode half reactions may occur to form an electrochemical cell together with the sensing electrode and the electrolyte. Furthermore, the electronic device 15 may apply a voltage to the sensing layer 3 via the conducting layer 5, at which voltage a current may be measured between the working electrode 13 and the sensing electrode 2, via the conducting layer 5 and sensing layer 3.

The sensing layer 3 is sensitized for the analyte A by the process of preparing the polymer mixture of the sensing layer, which is described in further detail below. The sensing layer 3 comprises a semiconducting polymer, the electronic properties of which change upon a change of the concentration of the analyte within the sensing layer 3. This in turn changes the measured current between the sensing layer and the counter electrode at a certain voltage applied to the sensing layer, wherein the voltage is referenced to the reference electrode 11. The current measured at a certain voltage relates to a certain concentration of analyte in the sensing layer, which in turn is a measure of the analyte concentration in the electrolyte solution 9.

Figure 2:
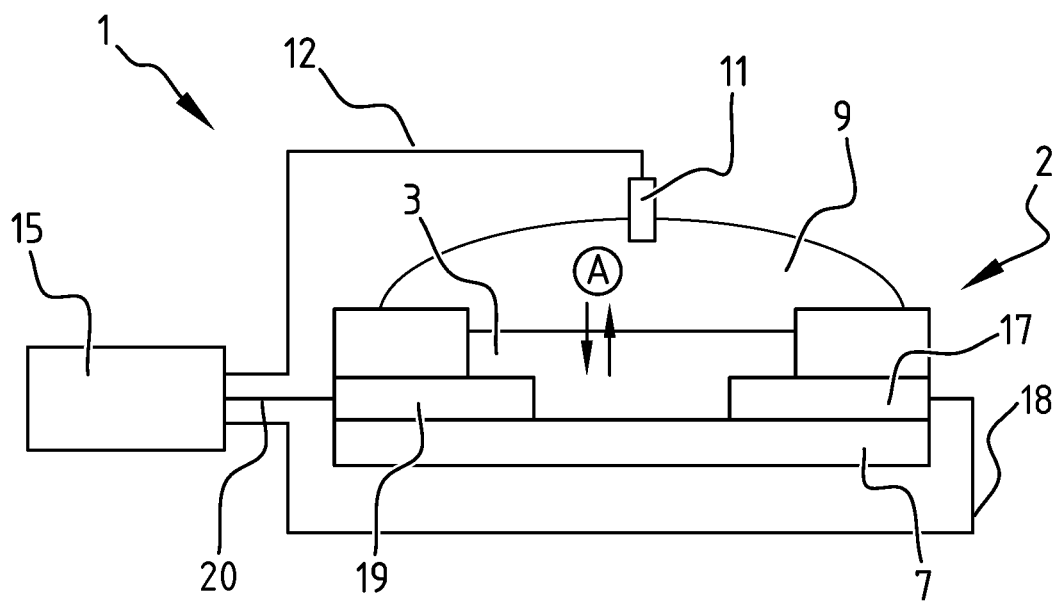
FIG. 2 schematically illustrates across-sectional view of another embodiment of the sensor electrode in a sensor device.

FIG. 2 shows another embodiment of the sensor device 1, wherein the sensing electrode 2 is embodied as a so called organic electrochemical transistor (OECT), which transduces the ionic flux of analyte into the sensing layer into electronic signals via source 19 and drain 17 electrodes. The drain electrode 17 is connected via connection 18 to the electronic device 15. The source electrode 19 is connected via connection 20 to the electronic device 15. The source 19 and drain 17 electrodes are distanced from each other, and the sensing layer 3 is disposed between the source and drain electrodes.

In general, an OECT is a transistor wherein ions from the electrolyte move into—or are "injected into"—the sensing layer, or so-called semiconductor channel, and thereby influence the drain current. The injection of ions in the semiconducting channel is controlled through the application of a voltage to the gate electrode. The drain current flowing from the source 19, through the sensing layer 3 and to the drain 17 is proportional to the effective volumetric capacitance C* of the sensing layer. The effective volumetric capacitance includes both ionic and electronic components, both of which are affected by ions—i.e. the analyte—penetrating into the sensing layer 3.

Also the configuration of the device 1 of FIG. 1 may be seen as an OECT, since the resistance between the counter electrode, through the electrolyte and with the sensor electrode is negligible, whereby the counter (Pt) electrode may be seen as a source terminal and the conducting (ITO) layer the drain terminal. The gate is the sensing layer itself, wherein gating occurs due to molecular entities diffusing into the sensing layer. The molecular entities are specifically the analyte for the sensing layers according to the present embodiments due to the preferential site formation.

The sensing layer 3 comprises a polymer mixture including a semiconducting polymer comprised of monomeric units comprising one or more thiophene moieties along a backbone chain and at least two polar side chains covalently bonded to the backbone chain. Suitable semiconducting polymers have an electron and/or hole mobility of at least $1\times10^{-2}$ $cm^2V^{-1}s^{-1}$, preferably at least $1\times10^{-1}$ $cm^2V^{-1}s^{-1}$.

The polymer mixture further comprises a hydrophilic polymer comprised of monomeric units comprising one or more carbon-carbon bonds and one or more of hydroxyl, ester, carbonyl or amide moieties. The combination of these two polymers provides a semiconducting mixture wherein molecular species, as ions or uncharged, may penetrate. Furthermore, the polymer mixture forms a hydrogel when placed in a suitable environment, e.g. an aqueous environment.

During the preparation of the electrode, as described below for the most preferred embodiment, the hydrophilic polymer is cross-linked by a reaction with a cross-linking agent resulting in the cross-linking of the hydrophilic polymer by reacting with the hydroxyl, ester, carbonyl or amide moieties. Suitable cross-linking agents comprise anhydrides, being preferably bi-functional, carboxylic acids (e.g. polyethylene glycol-diacid), isocianates, epoxides, and siloxanes. In the most preferred embodiment, the hydrophilic polymer is poly-vinyl alcohol and the cross-linking agent maleic anhydride.

During the sensor electrode preparation, furthermore an amount of analyte is mixed with this cross-linked polymer mixture, and later removed. Due to this addition of analyte during the preparation of the polymer mixture of the sensing layer, the resulting sensing layer is highly sensitive to the analyte. Also, results show that the sensing layer is also selective towards the analyte. It is envisioned that preferential sites for the analyte are formed within the polymer mixture of the semiconducting polymer and the cross-linked hydrophilic polymer, due to the presence of various mechanisms described below in relation to FIG. 15.

In the embodiment of FIG. 2, upon application of a certain voltage $V_S$ to the source contact 19 w.r.t. the reference electrode 11 via electronic device 15, a drain current $I_D$ is measured. Due to the presence of the analyte, the effective capacitance including both ionic and electronic components, changes, resulting in a change of the effective gating voltage within the sensing layer. This in turn alters the drain current. As such, the sensing layer is a self gating layer, or in other words, the sensing layer provides an amplification effect.

Figure 3:
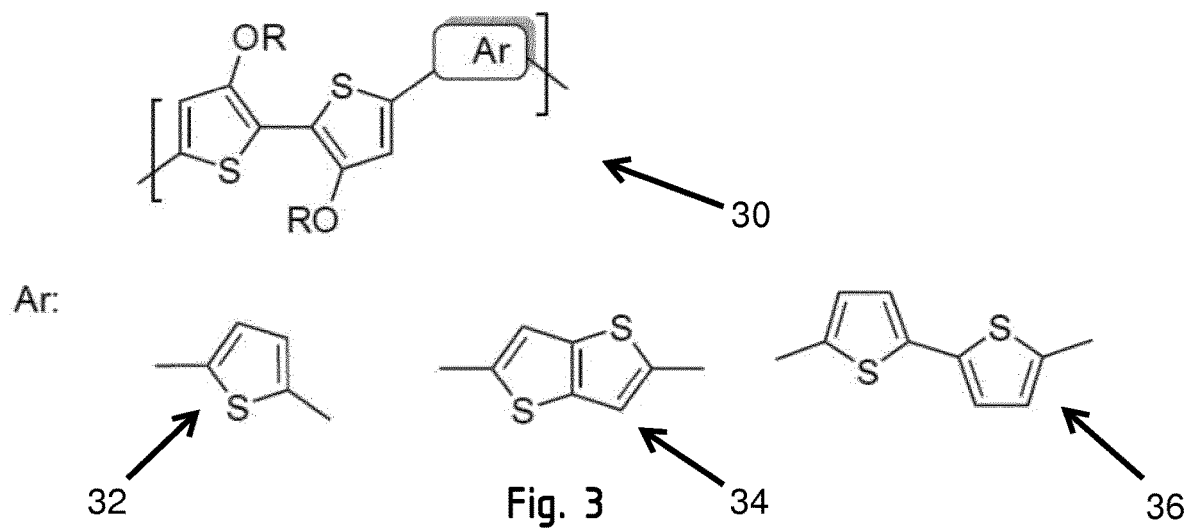
FIG. 3 schematically illustrates a structural formula of a poly(bithiophene-AR) with AR begin several further moieties according to embodiments of the semiconducting polymer.
Figure 4:
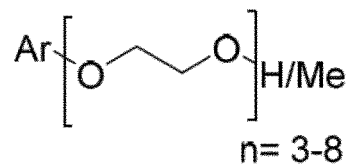
FIG. 4 schematically illustrates a structural formula of linear poly-ethylene glycol according to an embodiment of a side chain.
Figure 5:
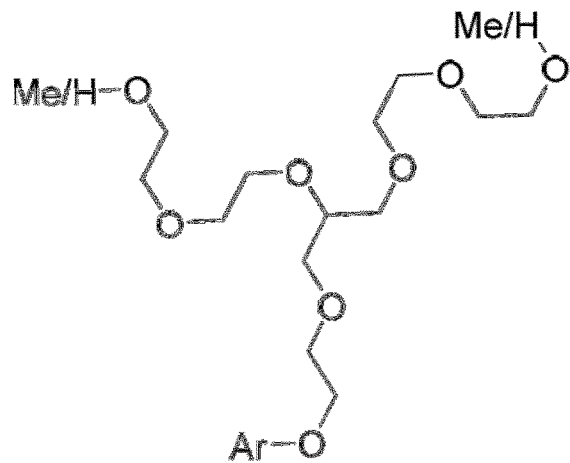
FIG. 5 schematically illustrates a structural formula of branched poly-ethylene glycol according to an embodiment of a side chain.

In an embodiment, as shown in FIG. 3, the sensing layer 3 comprises a semiconducting polymer poly[3,3'-bis (OR)-2,2'-bithiophene-Ar] 30, wherein the Ar-group is a thiophene group 32, a thienothiophene group 34, or another 2,2'-bithiophene group 36. These semiconducting polymers are denoted as "g2T"-type polymers. These type of polymers have a hole mobility of about 1 cm2/Vs, furthermore have a HOMO level of about 4.4 eV vs. vacuum, which gives a low voltage, around 0 V, against a Ag/AgCl reference electrode, and indicates that the semiconducting polymer has sufficient stability against oxidation. Furthermore these g2T-type polymers have suitable mechanical properties and stability to prepare the polymer mixture. The R-groups are preferably methyl-terminated polyethylene glycol groups, as shown in FIGS. 4 (linear) and 5 (branched). These polar side chains provide means of stabilizing the semiconducting polymer in the hydrogel and further provide an ion-conducting property to the semiconducting polymer and hydrogel. The Ar-groups indicated in FIGS. 4 and 5 depict where a covalent bond with the semiconducting polymer would be. With such R-groups, the monomer unit is 3,3'-bis(alkoxy)-2,2'-bithiophenethienothiophene, referred to as "g2T-TT". Most preferably, the g2T-TT has R-groups having three ethylene glycol molecules—i.e. triethylene glycol—wherein the monomer unit is 3,3'-Bis(2-(2-(2-methoxyethoxy) ethoxy)ethoxy)-2,2'bithiophene-thienothiophene.

Figure 6:
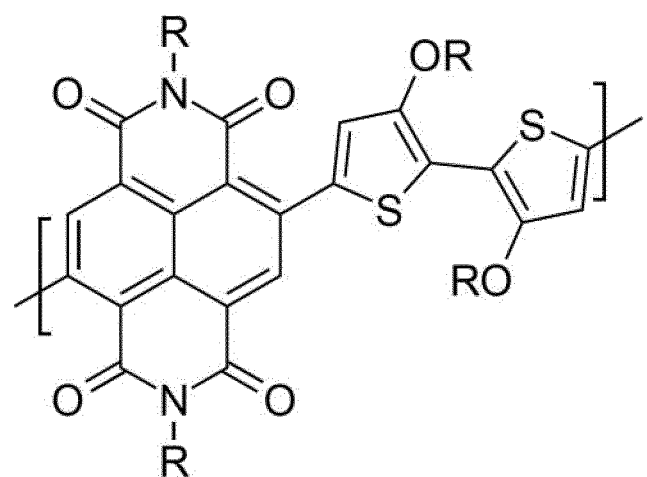
FIG. 6 schematically illustrates a structural formula of poly(naphthalene diimide-bithiophene) according to an embodiment of the semiconducting polymer.

In another embodiment, as shown in FIG. 6, the semiconducting polymer is naphthalene diimide-bithiophene (NDI-g2T), that is, poly[N,N'-bis(R)-3,4,9,10-perylene diimide-1,7-diyl-alt-2-(3,3'-di-(OR)-[2,2'-bithiophen]-5-yl)-thieno[3,2-b]thiophene-2,6-diyl]. NDI-g2T has hole and electron mobilities of about 5 $cm^2/Vs$ and furthermore suitable energy levels for the sensing device of the present application, since the HOMO level is 4.8 eV vs. vacuum and the LUMO level is about 4.1 eV vs. vacuum. The R-groups are preferably methyl-terminated polyethylene glycol groups, as shown in FIGS. 4 and 5, having most preferably three to eight ethylene glycol moieties.

Figure 7:
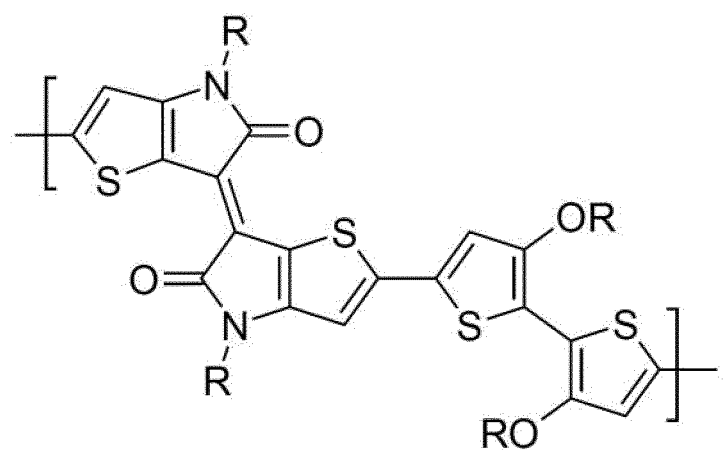
FIG. 7 schematically illustrates a structural formula of poly(isoindigo-bithiophene) according to an embodiment of the semiconducting polymer.

In yet another embodiment, as shown in FIG. 7, the semiconducting polymer is isoindigo-bithiophene (isoindigo-g2T), that is poly[(E)-4,4'-bis(R)-[6,6'-bithieno[3,2-b] pyrrolylidene]-5,5'(4H,4'H)-dione-2,2'-diyl-alt-2-(3,3'-di-(OR)-[2,2'-bithiophen]-5-yl)-thieno[3,2-b]thiophene-2,6-diyl]. Isoindigo-g2T has hole and electron mobilities of about 5 $cm^2/Vs$ and furthermore suitable energy levels for the sensing device of the present application, since the HOMO level is 5 eV vs. vacuum and the LUMO level is about 4.2 eV vs. vacuum. The R-groups are preferably methyl-terminated polyethylene glycol groups, as shown in FIGS. 4 and 5, having most preferably three to eight ethylene glycol moieties on the isoindigo-group, forming a [1,1'-bis(2-ethylene glycol)-[3,3'-biindolinylidene] moiety, and three ethylene glycol moieties on the g2T-group, forming a 3,3'-bis(2-(2-(2-methoxyethoxy)ethoxy)ethoxy)-2,2'-bithiophene moiety.

Figure 8:
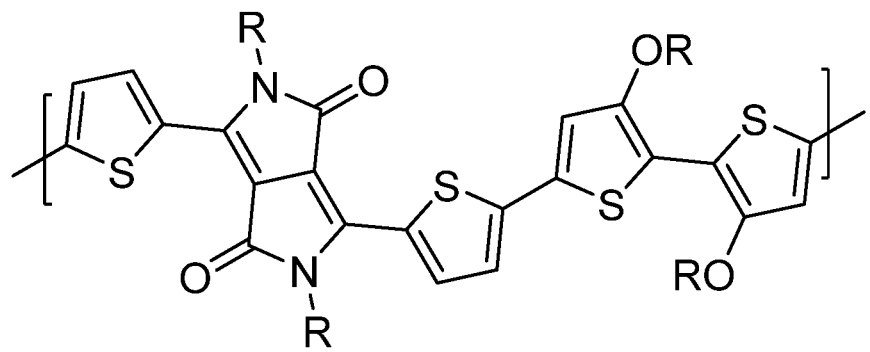
FIG. 8 schematically illustrates a structural formula of poly(diketopyrrolopyrrole-bithiophene) according to an embodiment of the semiconducting polymer.

In a further embodiment the semiconducting polymer is diketopyrrolopyrrole-bithiophene (DPP-g2T), that is, poly [(2,5-bis(R)-6-(thiophen-2,5-yl)pyrrolo[3,4-c]pyrrole-1,4 (2H,5H)-dione-diyl-alt-3,6-bis-2-(3,3'-di-(OR)-[2,2'-bithiophen]-5-yl)-thieno[3,2-b]thiophene-2,6-diyl]. The structural formula of DPP-g2T is shown in FIG. 8. DPP-g2T has hole and electron mobilities of about 5 $cm^2/Vs$ and furthermore suitable energy levels for the sensing device of the present application, since the HOMO level is 4.7 eV vs. vacuum and the LUMO level is about 4 eV vs. vacuum. The R-groups are preferably methyl-terminated polyethylene glycol groups, as shown in FIGS. 4 and 5, having most preferably three to eight ethylene glycol moieties when bonded the DPP group and three ethylene glycol moieties when bonded to the thiophene groups.

According to an embodiment, the hydrophilic polymer of the polymeric mixture of the sensing electrode is one of polyvinyl alcohol, polyacrylamide (poly(2-propenamide), chemical formula monomeric unit: [$CH_2CHCONH_2$]), poly (acrylic acid) having monomeric units of [$CH_2CHCOOH$], polyethylene glycol ($H[OCH_2CH_2]_nOH$), poly(2-oxazoline) (e.g. $CH_3[C_6H_{11}NO]OH$/poly(2-proyl-2-oxazoline) and polyvinylpyrrolidone ([$C_6H_9NO]_n$). These polymers are suitable to form a hydrogel type 3D structure while mixed with the semiconducting polymer. Furthermore, while (partially) cross-linked, these polymers provide a stable mechanical structure at room temperature, while having sufficient conformational freedom to allow the preferential sites of the analyte to form. These embodiments of the hydrophilic polymer furthermore contribute to the solvation and binding energies of the analyte. The above hydrophilic polymers comprise a mixture of lipophilic motifs (e.g. methylene C—H type or C—C type bonds) and polaR-groups (ester, hydroxyl, amide, etc.), allowing the polymer to mix with the semiconducting polymers and allowing for favorable ionic conduction properties once a hydrogel of the polymeric mixture is formed.

Figure 9:
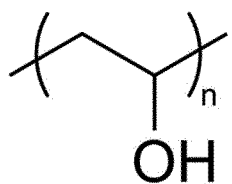
FIG. 9 schematically illustrates a structural formula of poly(vinyl alcohol)

Most preferably, the hydrophilic polymer is polyvinyl alcohol, [CH2CH(OH)]$_n$, the structural formula of which is shown in FIG. 9. Polyvinyl alcohol mixes with above noted semiconducting polymers. In all of the above, n denotes the number of monomeric units in a polymer molecule, which may vary but is generally given as an average value.

Figure 10:
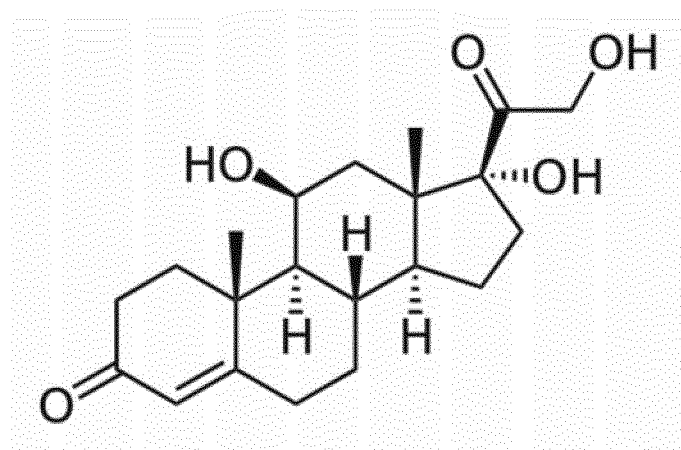
FIG. 10 schematically illustrates a structural formula of cortisol.

In the following, an example embodiment is described wherein cortisol, having a structural formula as shown in FIG. 10, is used as the analyte. According to the same method of preparation, several further electrodes were prepared in an analogous way for other analyte molecules, being (−)1,1'-bi-2-napthol having a structural formula shown in FIG. 11, 10-undecen-1-ol having a structural formula shown in FIG. 12, and IKVAV-OCys laminin peptide having a structural formula as shown in FIG. 13.

Figure 14A:
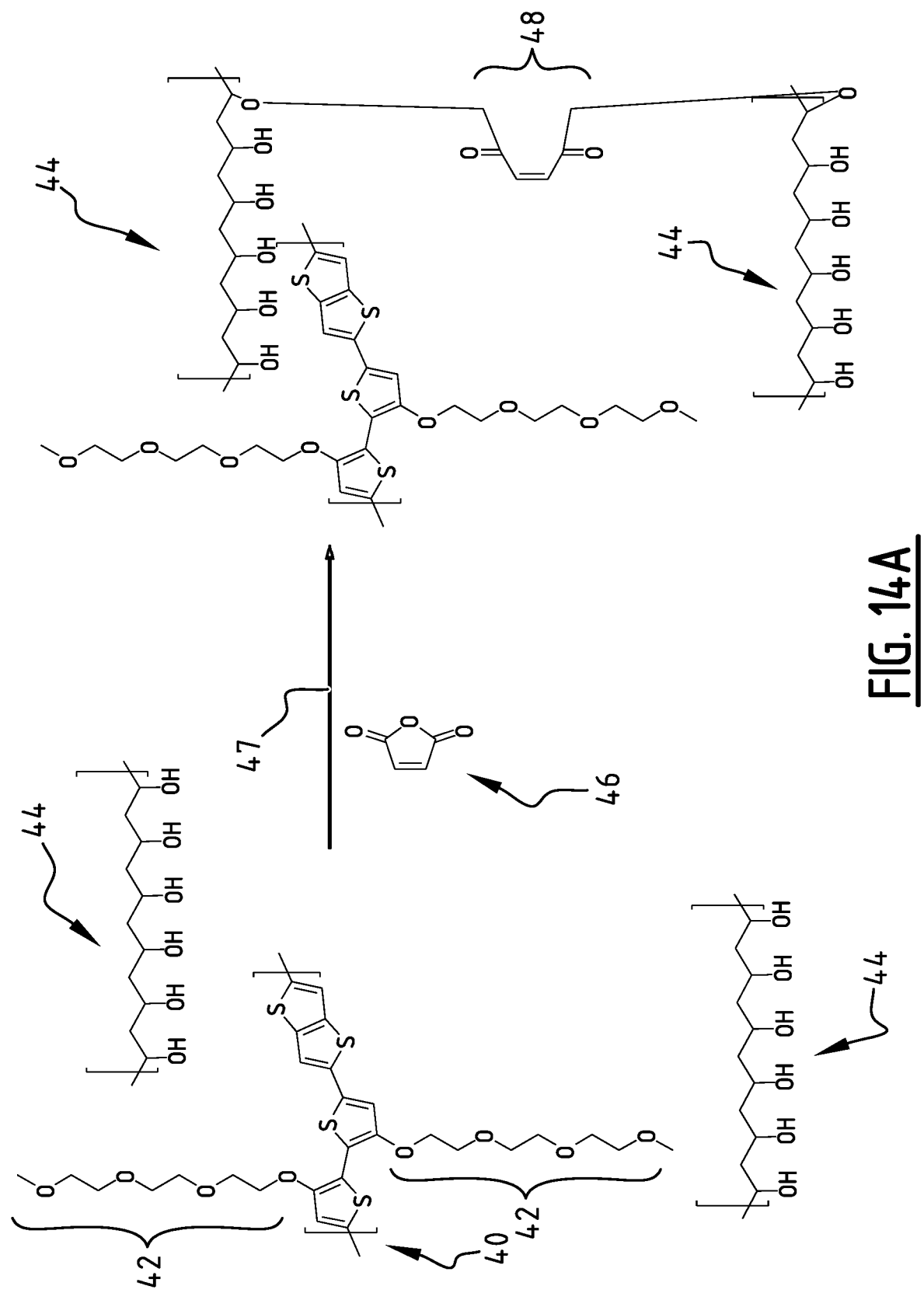
FIG. 14A schematically illustrates structural formulae of the polymer mixture wherein polyvinyl alcohol is cross-linked according to the method of preparing a sensor electrode according to embodiments.

The example embodiment employs cortisol as the analyte, and is prepared as follows:

First 5 mg of semiconducting polymer, namely dithiophene-thiethiophene having methylated tri-ethylene glycol molecules as side chains covalently bonded to the thiophene groups, as shown in FIG. 14A is provided. This semiconducting polymer, denoted with 40 in FIG. 14A is denoted with "g2T-TT" from hereon out. The g2T-TT has an average molecular weight ranging from about 30 to 80 kDa. Hereafter, 20 mg of polyvinylalcohol (PVA) having an average molecular weight of about 130 kDa is added. The two components are weighted in a vial to which 1 mL of dimethylformamide, DMF, a preferred embodiment of the polar aprotic solvent, is added. The DMF is preferably degassed/substantially oxygen free by flushing with an inert gas, e.g. argon, for at least several hours, for instance overnight. The g2T-TT has an estimated lower solubility limit in DMF of 5 mg/ml. The vial is vigorously stirred over night at 80° C. under an Argon atmosphere, in order to avoid oxidation of the mixture. The mixture now comprises g2T-TT 40 with triethylene glycol (TEG) side chains 42, PVA 44 and the solvent DMF. Organic semiconducting polymers are generally rigid, mostly due to stacking of pi/aromatic structures. To this end the hydrophilic polymer is added, allowing the formation of a hydrogel, wherein the semiconducting polymer is mixed. The polar R-groups of the semiconducting polymer in turn provide for stable mixing within the polymer mixture/hydrogel.

Then 2 mg of maleic anhydride (MA) 46 is added to partially cross link the matrix, as shown in FIG. 14A by arrow 47 and form a hydrogel-like composite cross linked 48 by the MA at hydroxide groups of the PVA 44. The solution is stirred for 6 h at 80° C. to ensure consumption of substantially all MA and to form a cross linked polymer mixture dissolved in the DMF.

Thereafter 5 mg of analyte, in this case cortisol, is added to the solution comprising the cross linked polymer mixture. The solution is stirred for 2 h at 50° C. 15 minute sonication follows then another 2 h stirring. The resulting state of the mixture is depicted schematically in FIG. 14B, wherein the cortisol 52 is positioned in a site 50 formed by the surrounding g2T-TT 40, TEG 42, PVA 44 and MA 48. Due to non-covalent interactions (e.g. H-bonds, pi-stacking), it is likely that the polymer mixture reorganizes, i.e. minimizes its (Gibbs) free energy, by templating around the target analyte, thus forming preferential sites. The nature of this preferential site is further discussed with respect to FIG. 15.

After the addition of cortisol, the volume of the solution is reduced from 1 mL to 0.2 mL and 0.8 mL of chloroform, CHCl$_3$ is added. The chloroform is favorable in the following drop casting of the solution on a solid substrate. The solution is drop cast on solid substrates in the following manner: 30 μL of the solution is drop cast onto a 1 cm$^2$ glass substrate comprising an Indium Tin Oxide, ITO, conductive layer.

The films are left to dry over 16 h under an oxygen reduced atmosphere—by applying a stream of argon over the films—which results in a uniform film—the sensing layer—which covers the ITO surface of the substrate and thereby forming the sensor electrode comprising the sensing layer with the cross-linked polymer mixture. The volume of solution drop cast per unit of area of substrate, here 1 cm$^2$, determines the thickness of the sensing layer.

Thereafter, the sensor electrode is placed in an electrolyte solution, with 0.1 M NaCl as electrolyte. In order to remove the cortisol from the sensing layer and to test the sensor, cyclic voltammetry, CV, is then used. A standard three electrode CV setup with suitable electronics is used with an Ag/AgCl reference electrode (e.g. with sat. KCl), a platinum mesh counter electrode and the sensor electrode as the working electrode. The volume of electrolyte solution is kept at 10 mL.

A voltage is then applied to the sensing layer is then cycled from −200 to 800 mV, until a steady state is reached (usually 20-50 cycles). It is determined that at a voltage above 500 m V, substantially all cortisol has been extruded from the film. The state of FIG. 14C, wherein the MA 58 has undergone a cis-trans transformation due to the application of the voltage, which may also trigger electron donations 54, 56, may aid in making the site 50 temporarily unfavorable for the cortisol. The polymer mixture with preferential site 50 remains stable. An alternative way to remove the cortisol is to wash the sensor electrode with a clean solution, i.e. without cortisol, but the electrochemical method is preferred since it is fast and gives a lower resulting cortisol concentration. Once no, or a lower, voltage is applied, the MA 48 may convert back to its normal cis-state, resulting in the schematic structure of FIG. 14D.

In this way, a sensor electrode having preferential sites for the analyte is prepared, wherein the analyte is removed. Thereafter the sensor electrode may be calibrated if so required and/or used to measure an analyte concentration in a solution.

In order to test the sensor electrode, the electrolyte solution is removed, CV set-up is washed with 0.1 M NaCl solution, and a new clean 0.1 M NaCl electrolyte solution is added.

The voltage applied to the sensing layer is cycled from −200 to 800 mV in order to ensure the sensor functions at a steady state, meaning that the current measured at each voltage is substantially constant. Optionally, the electrolyte solution can be changed again and the set-up washed in case it is determined likely that further cortisol was still present in the sensing layer, and now in the electrolyte solution.

The voltage applied to the sensing layer is then cycled from −200 to 50 mV about 50 times. In this regime, cortisol should still be able to bind whilst not being excluded electrochemically.

The sensor is then applied to sensing solutions of known cortisol concentrations. 0.1 mL of (0.1 M human saline) cortisol solution is added (so as to have a minimal impact on the volume of the test solution, i.e. so that the surface area of the sensor electrode exposed to the electrolyte solution doesn't increase noticeably), the sensor left 5 minute to incubate, then again −200 mV to 50 mV cyclic voltammetry sweep is measured until a steady state is reached.

It will be understood that other voltages, weights of material etc. may be applied without departing from the invention. For instance, a constant voltage may be applied, in order to remove the analyte and for measuring a current. Also, instead of full cyclic voltammetry, the voltage may be switched between two or more voltages with certain timing in between.

Figure 14B:
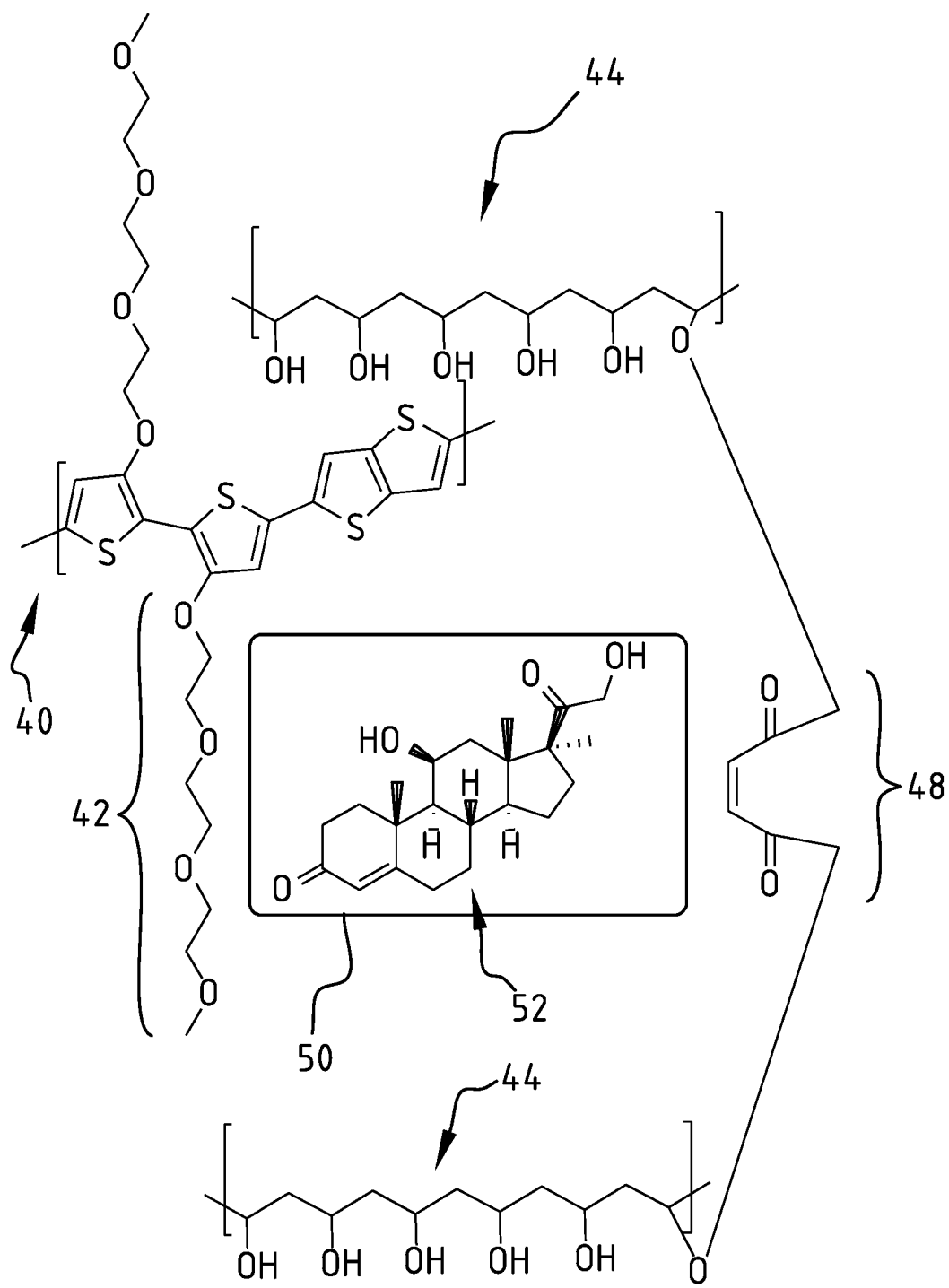
FIG. 14B schematically illustrates structural formulae of the polymer mixture and a preferential site formed for cortisol.
Figure 14C:
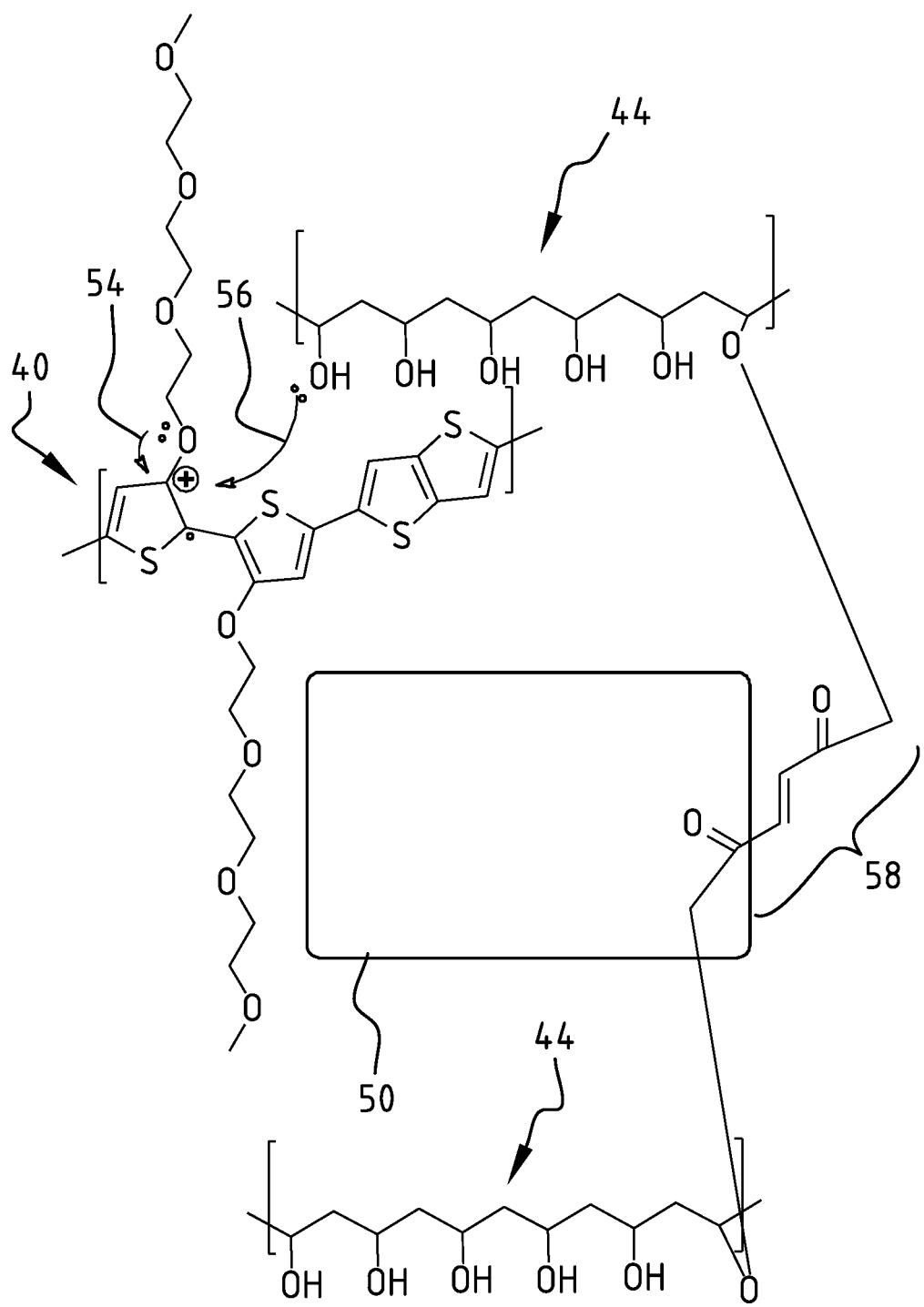
FIG. 14C schematically illustrates structural formulae of the polymer mixture showing a mechanism of removing cortisol.
Figure 14D:
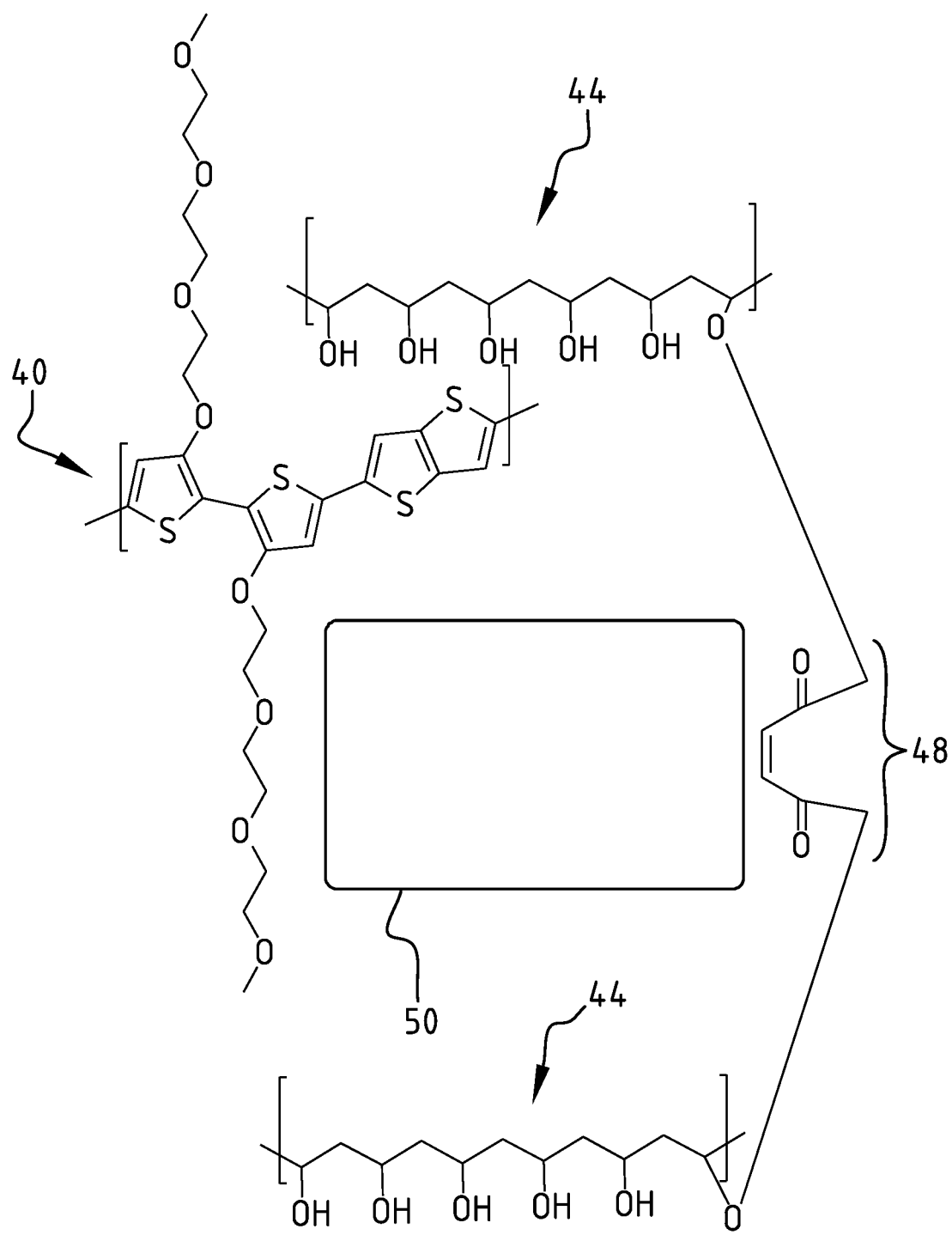
FIG. 14D schematically illustrates structural formulae of the polymer mixture comprising an empty preferential site.
Figure 15:
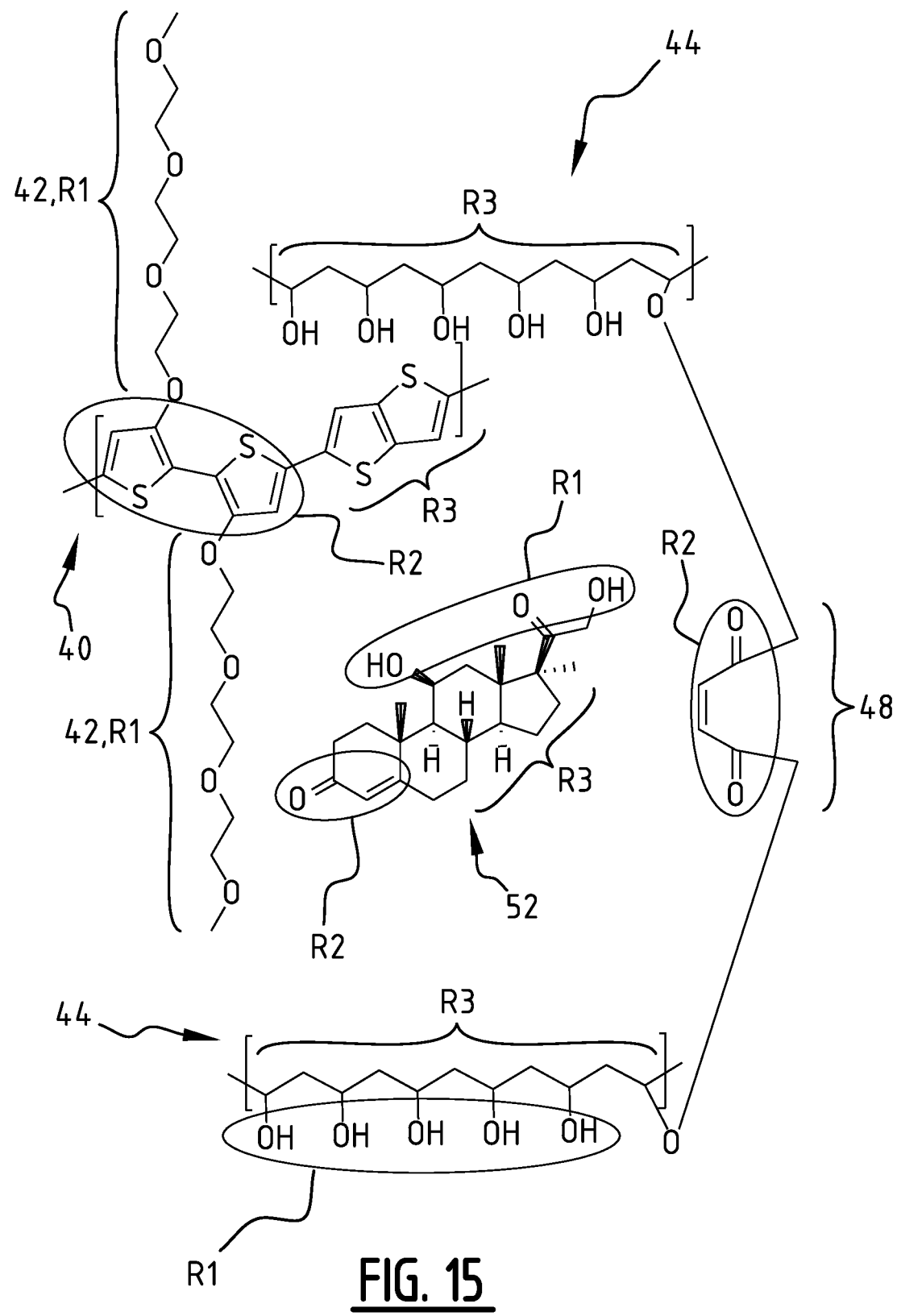
FIG. 15 schematically illustrates bonding groups within structural formulae of the polymer mixture.

FIG. 15 shows an envisioned schematic view of the structure of the polymer mixture of the sensing layer from FIG. 14B. The g2T-TT, PVA, and MA have chemical moieties oR-groups having certain (non-covalent) properties for (non-covalent) bonding with the analyte, in this case cortisol 52. With R1, moieties capable of forming hydrogen bonds are denoted, being hydroxyl, double bonded oxygen, and TEG chains. Hence, the R1 group of the cortisol may form hydrogen bonds with the R1 groups of the PVA and the TEG. Furthermore, R2 indicate moieties having hydrophobic and pi-stacking properties. Finally, groups indicated with R3 are hydrophobic (and generally lipophilic) having a generally flat steroid structure that may stack on top of the g2T-TT backbone chain. Due to the large size of the polymer molecules, during the mixing with cortisol, preferably at elevated temperatures, the polymers may change their position such that surrounding of the cortisol is formed having a lowest energy for the whole system (polymer mixture and cortisol).

For example, in the case of cortisol with a sensor electrode comprising a polymer mixture with g2T-TT and PVA cross linked with MA, the bonding energies is estimated as follows: 2 H-bond donors: 2×5 kcal/mol, 4×H-bond acceptors=4×5 kcal/mol, pi stack cortisol enone—g2T-TT pi system=5 kcal/mol, hydrophobic interactions: about 5 kcal/mol as cortisol is a large molecule with a relatively high degree of hydrophobic surface. Under the assumption of linear additive cooperation of these interactions the total binding enthalpy becomes about 45 kcal/mol or 180 kJ/mol. The sum of cooperative binding is probably governed by higher order dynamics. This simple model doesn't take into account entropic factors or other factors which contribute to the enthalpic binding such as hydration. The total binding Gibbs free energy is estimate to lie within the region 200 to 250 kJ/mol. This is comparable to natural antibodies having relatively high bonding energy for a target molecule.

The mechanisms of the preferential site formation shown in FIGS. 14B-14D and FIG. 15 are provided for explanatory purposes, and do not limit the invention. The sensor electrode according to the described embodiments-comprising the cross-linked polymer mixture deposited with mixed analyte-provides means to sense a broad range of analytes and a broad range of analyte concentrations, described in relation to FIGS. 16-20 below.

Figure 16:
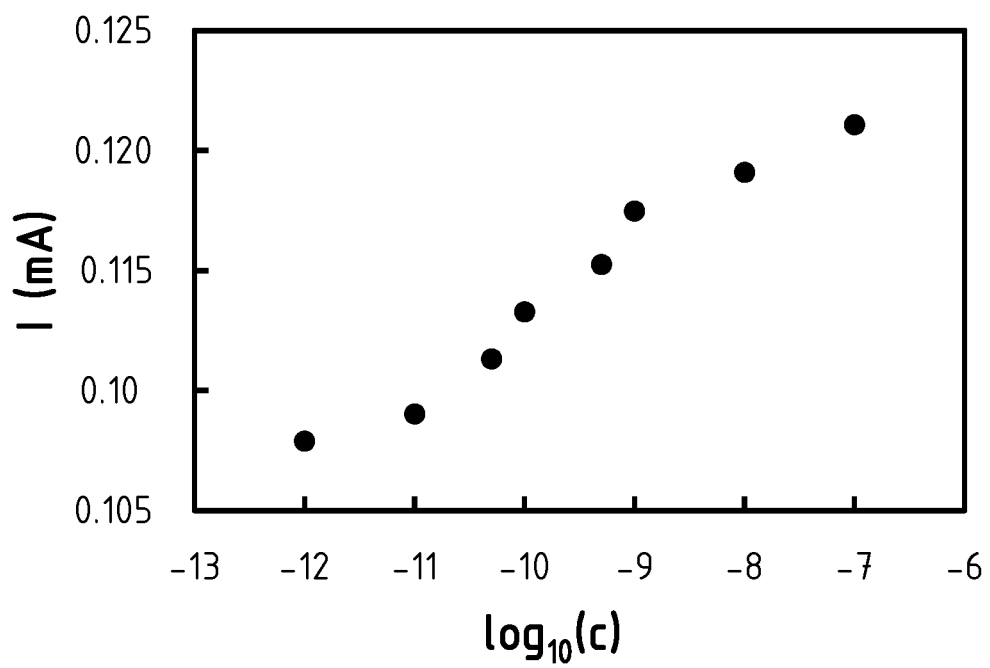
FIG. 16 illustrates sensor data for a sensor electrode prepared for cortisol as analyte.

Example measurements using the above denoted sensor device and sensor electrode according to the example preparation, of cortisol concentration in the aqueous electrolyte are shown in FIG. 16. The horizontal axis indicates the logarithm of the cortisol concentration in mol/L or molar (M), while the vertical axis indicates the output current in mA of the sensor electrode versus the working electrode in the three-electrode setup described above. The current corresponds to a voltage applied to the sensor electrode of 140 mV against the Ag/AgCl reference electrode.

Figure 17:
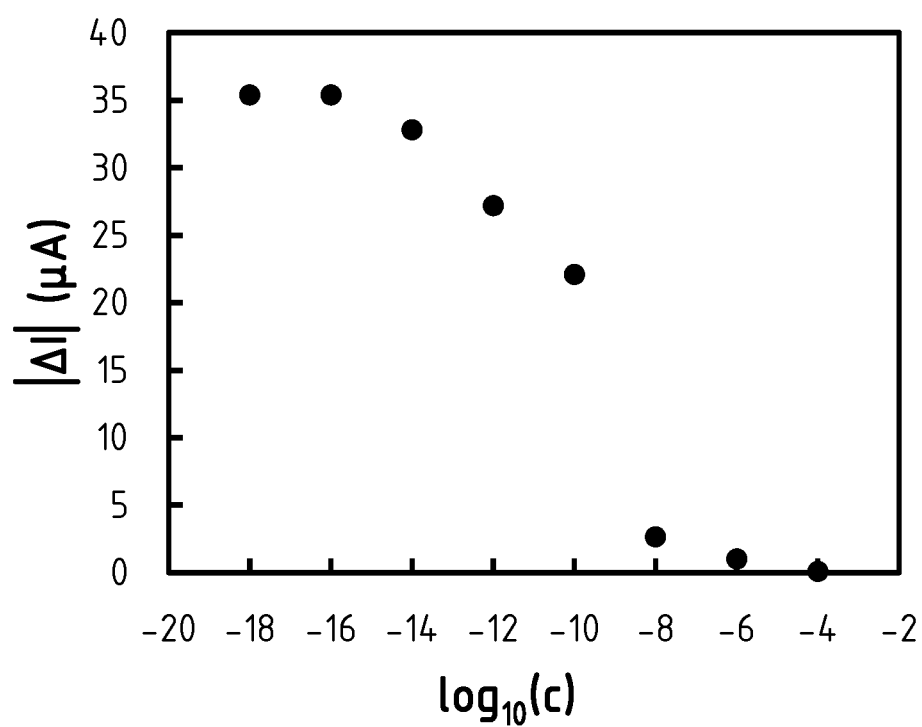
FIG. 17 illustrates normalized sensor data for a sensor electrode prepared for cortisol as analyte.

FIG. 17 shows further data relating to cortisol but for another sensor electrode, wherein the absolute value of a change in current $\Delta I$ in $\mu A$ is given on the vertical axis. The change in current is calculated by subtracting a reference value from the output current of the sensor at a voltage of 140 mV vs. Ag/AgCl. The reference value is current measured at the same applied voltage (140 mV) without cortisol. The change in current $\Delta I$ therefore gives a normalized value of the measured current, and enables a more direct view the effect of the cortisol concentration. Furthermore, differences in the surface area of the sensor electrode exposed to the electrolyte is compenensated for with the normalized current. Hence, a reference current is preferably measured for the specific electrode with the specific surface area exposed to the electrolyte. It is noted that the trend of current vs. concentration as visible is FIG. 16 already shows the sensor electrodes disclosed herein are sensitive to cortisol, without the need of the normalized values of FIG. 17.

In particular in view of FIG. 17, the current changes along a broad range of concentrations starting below $10^{-14}$ up to about $10^{-7}$ M, meaning the sensor is sensitive in a range of cortisol concentrations corresponding to biological systems, e.g. in humans. With these cortisol ranges, the sensor could furthermore be used to measure cortisol for example in sewage water. Between $10^{-10}$M and $10^{-8}$ M the sensor electrode has the highest sensitivity, being where the slope is highest. This region is suitable for cortisol saliva measurements, since saliva generally has a cortisol concentration around $10^{-9}$ M.

The sensor electrode was furthermore used for measuring the cortisol concentration in a human saliva sample. The saliva concentration obtained from the measured current agreed with the expected value, thereby also indicating a high selectivity of the sensor electrode towards the analyte, in view of the many other compounds present in saliva.

Figure 12:
FIG. 12 schematically illustrates a structural formula of 10-undecen-1-ol according to an embodiment of the analyte.
Figure 13:
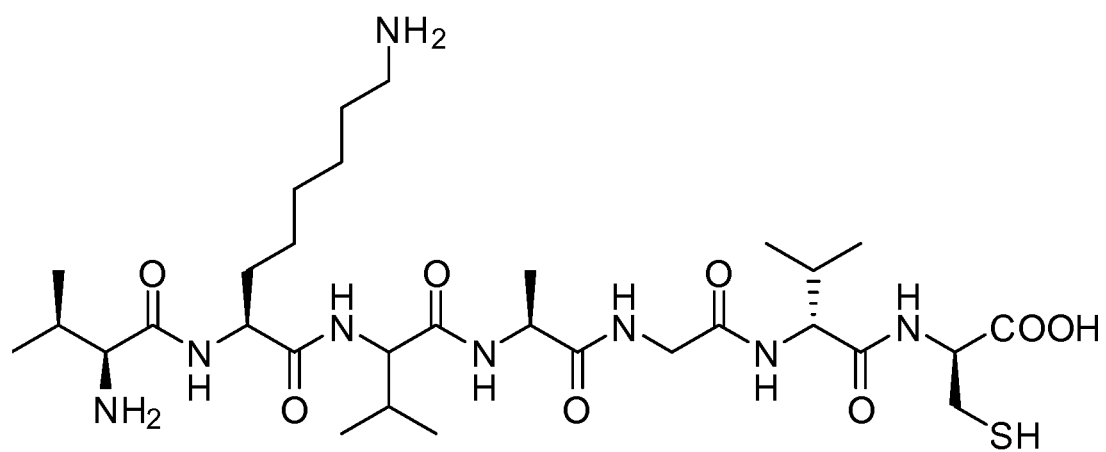
FIG. 13 schematically illustrates a structural formula of IKVAV-OCys laminin peptide according to an embodiment of the analyte.
Figure 18:
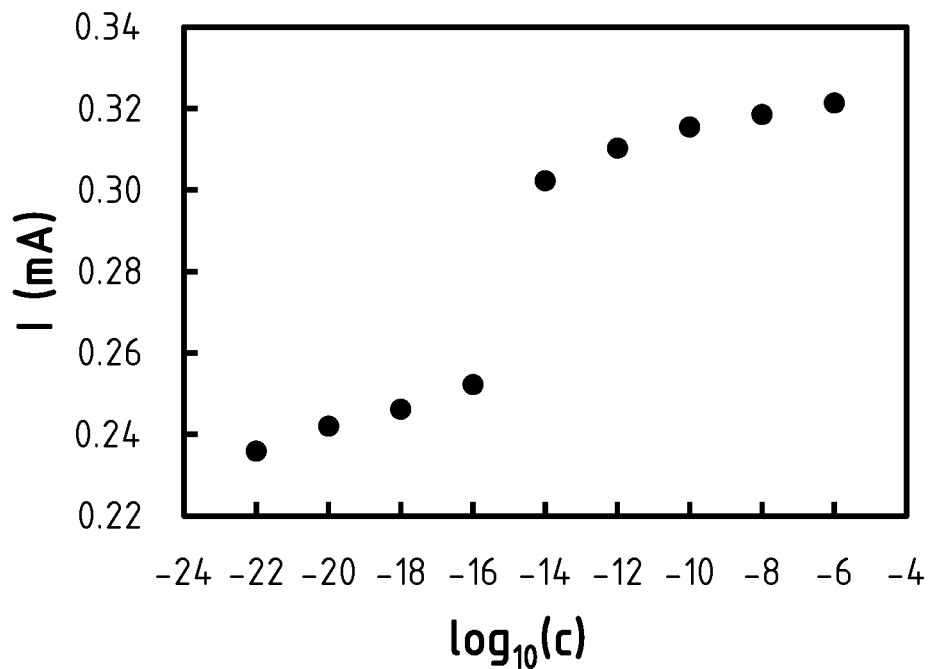
FIG. 18 illustrates sensor data for a sensor electrode prepared for 10-undecen-1-ol as analyte.

FIG. 18 shows similar data as for the cortisol data of FIG. 16, but now for another analyte, namely 10-undecen-1-ol, the structural formula of which is shown in FIG. 12. The current was measured at a voltage of 100 mV against the Ag/AgCl reference electrode. This embodiment of the sensor electrode was prepared analogously to the above described method, but now with 10-undecen-1-ol as the analyte. The molecule above was chosen in order to mimic molecular properties typically found in living environments, in particular due to comprising a long rod aliphatic moiety and a hydrophilic head (hydroxyl). In particular, this molecule mimics fatty alcohols found in biological systems. Furthermore, the molecule may also model for insect sex pheromones—important in the agricultural sector.

The results of FIG. 18 show the sensor electrode can sense the analyte even at very low concentrations, namely $10^{-22}$ M (i.e. close to Avogadro's number). It remains sensitive up to $10^{-6}$ M. This shows that the sensor can sense 10-undecen-1-ol for a broad range of applications.

Figure 11:
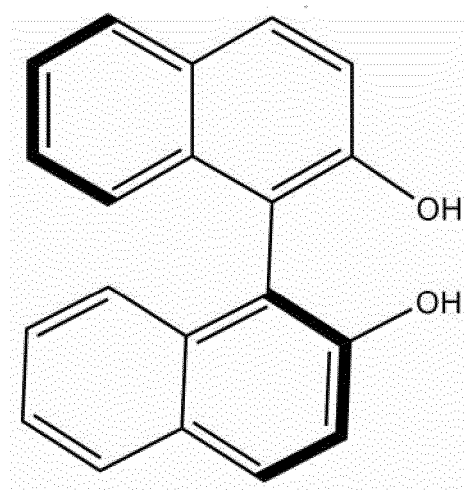
FIG. 11 schematically illustrates a structural formula of (−1),1'-bi-2-napthol according to an embodiment of the analyte.
Figure 19:
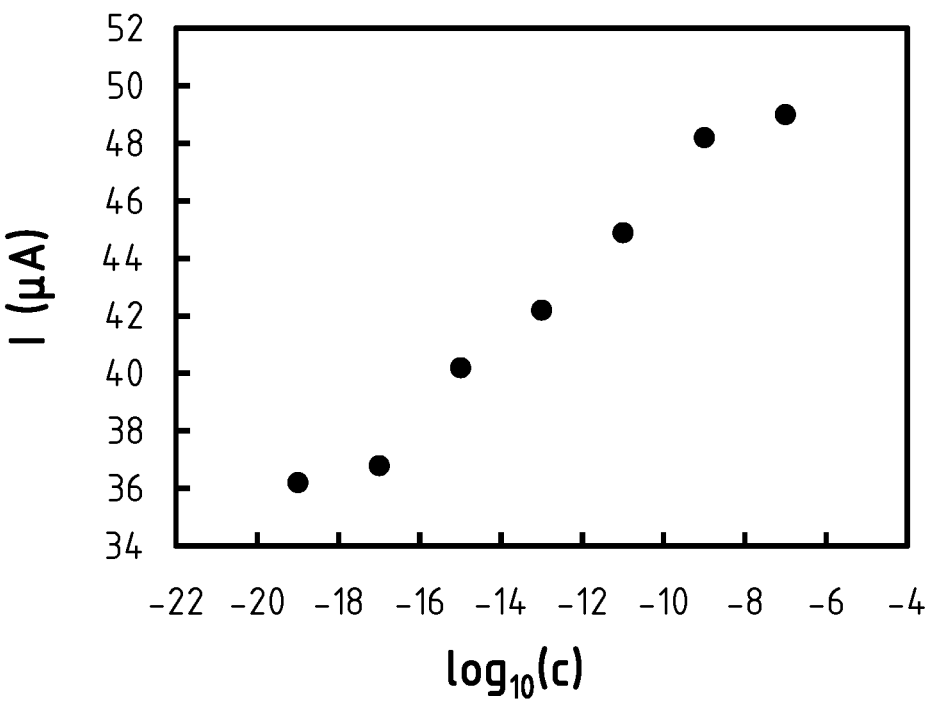
FIG. 19 illustrates sensor data for a sensor electrode prepared for (−1),1'-bi-2-naphtol as analyte.

FIG. 19 shows measured current data vs. log of concentration of (−1),1'-bi-2-naphtol, measured at 250 mV against the Ag/AgCl reference electrode. The structural formula of (−1),1'-bi-2-naphtol is shown in FIG. 11. This analyte was chosen to represent medium sized aromatic organic moieties with a semi-out-of-plane disc-like structure. This embodiment of the sensor electrode is prepared with (−1),1'-bi-2-naphtol as the analyte. A change in current is observed from $10^{-19}$ M up to $10^{-7}$ M, again showing the sensitivity of the sensor prepared according to the methods disclosed in the present patent disclosure.

Figure 20:
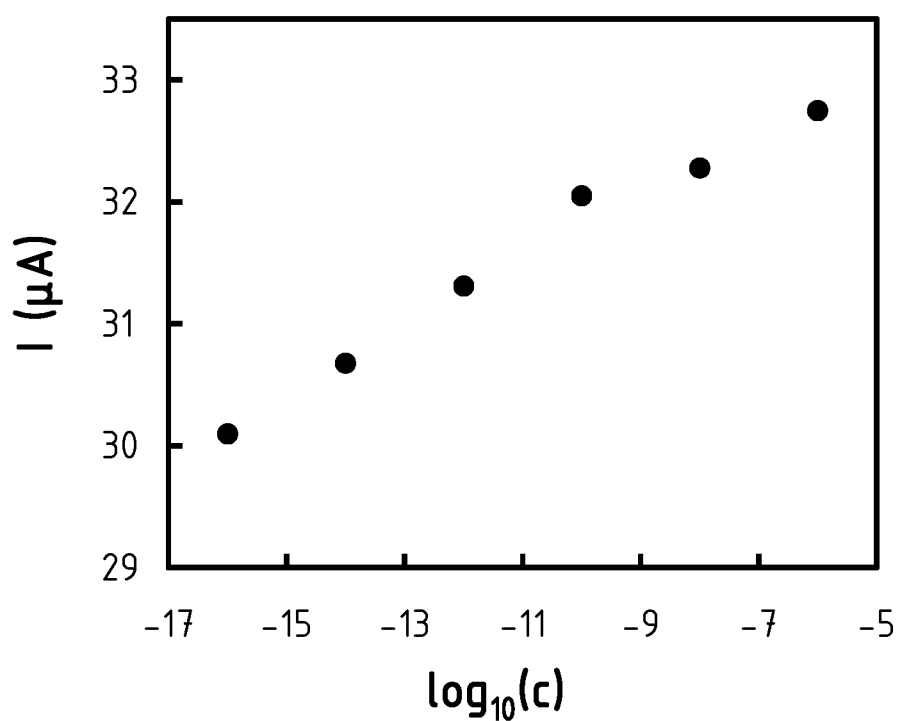
FIG. 20 illustrates sensor data for a sensor electrode sensitized for laminin binding peptide IKVAV-OCys as analyte.

FIG. 20 shows measured current data vs. log of concentration of the laminin binding peptide IKVAV, measured at 200 mV against the Ag/AgCl reference electrode. The structural formula of this peptide is shown in FIG. 13. This embodiment of the sensor electrode is prepared with laminin binding peptide IKVAV as the analyte. The analyte was chosen to as a model analyte for peptidic type biological sensing. In a concentration range of $10^{-6}$ to $10^{-16}$ M, a roughly linear response in current is obtained.

FIGS. 16-20 show the method of preparation of the sensor electrode described above allow for a broad range of analytes, in particular organic compounds having a molecular weight ranging from 100 Da to 2000 Da, preferably 150 Da to 1500 Da.

The above described embodiments describe a new type of sensor, combining OECT-compatible materials with molecular imprinting. This new method exploits the intrinsic properties of organic semiconductors, more specifically mixed ionic electronic organic semiconductors to create a sensor matrix. Biosensors in general may be described to have a recognition element, being a site for an analyte. A signal from the recognition element is transduced to obtain the signal and thereafter processed and amplified. According to the presently described embodiments, beneficially, the amplification and transduction occurs in the recognition element, namely the polymer sensing layer, due to the electronic and ionic properties of the semiconducting polymer in the hydrogel.

The polymer mixture furthermore allows for a generic "molecular imprinting" of analyte molecules, that is, by 'moulding' the hydrogel around individual molecules during the synthesis of the sensing layer.

The sensing layer may be described as a quasi-infinite series of molecular level transistors shaped into place to function as pseudo-antibody like binding sites. That is, each binding site functions as both a recognition element and an amplifier. When a (specific) analyte molecule of interest binds, local gating occurs leading to an exponential increase in ultimately measured signal. All of these mini-sensors/transistors are coupled, i.e. they gate each other. This leads to a cascading effect in which the signal is locally and globally amplified.

Another way to look at this is that the current is modulated within the sensing layer in a specific fashion by forming these specific binding sites, which leads to an improved signal to noise ratio.

Whilst the principles of the invention have been set out above in connection with specific embodiments, it is to be understood that this description is merely made by way of example and not as a limitation of the scope of protection which is determined by the appended claims.

The invention claimed is:

1. Method of preparing a sensor electrode for measuring an analyte concentration in an aqueous solution, the method comprising:
a) providing a mixture comprising:
semiconducting polymer comprised of monomeric units comprising one or more aromatic moieties along a backbone chain and at least two covalently bonded polar side chains, wherein the semiconducting polymer has an electron and/or hole mobility of at least $1\times10^{-2}$ cm$^2$V$^{-1}$s$^{-1}$,
hydrophilic polymer comprised of monomeric units comprising one or more carbon-carbon bonds and one or more of hydroxyl, ester, carbonyl or amide moieties, wherein the weight ratio of semiconducting polymer to hydrophilic polymer ranges from 1:100 to 1:1;
b) dissolving the mixture of step a) in a polar aprotic solvent, thereby forming a dissolved polymeric mixture;
c) adding a cross-linking agent to the mixture of step b), wherein the addition of the cross-linking agent results in the cross-linking of the hydrophilic polymer by reacting with the hydroxyl, ester, carbonyl or amide moieties;
d) adding of the analyte to the cross-linked mixture of step c) in a weight percentage of 1 to 2500 wt %, based on the weight of the semiconducting polymer of step a);
e) allowing a mixture to form comprising preferential sites for the analyte formed by the semiconducting polymer and the cross-linked hydrophilic polymer;
f) depositing the cross-linked mixture of step d) onto a solid substrate; and
g) drying the mixture deposited on the solid substrate of step e), thereby forming the sensor electrode.

2. Method according to claim 1, wherein the semiconducting polymer is any one of {poly[3,3'-bis(OR)-2,2'-bithiophene-thienothiophene];
poly[N,N'-bis(R)-3,4,9,10-perylene diimide-1,7-diyl-alt-2-(3,3'-di-(OR)-[2,2'-bithiophen]-5-yl)-thieno[3,2-b]thiophene-2,6-diyl];
poly[(2,5-bis(R)-6-(thiophen-2,5-yl)pyrrolo[3,4-c]pyrrole-1,4(2H,5H)-dione-diyl-alt-3,6-bis-2-(3,3'-di-(OR)-[2,2'-bithiophen]-5-yl)-thieno[3,2-b]thiophene-2,6-diyl]; and
poly[(E)-4,4'-bis(R)-[6,6'-bithieno[3,2-b]pyrrolylidene]-5,5'(4H,4'H)-dione-2,2'-diyl-alt-2-(3,3'-di-(OR)-[2,2'-bithiophen]-5-yl)-thieno[3,2-b]thiophene-2,6-diyl]},
wherein R is methoxy-terminated polyethylene glycol comprising at least 3 ethylene moieties.

3. Method according to claim 1, wherein the hydrophilic polymer is at least one of polyvinyl alcohol, polyacrylamide, polyacrylic acid, polyethylene glycol, polyoxazoline and polyvinylpyrrolidone.

4. Method according to claim 1, wherein the monomeric units of the hydrophilic polymer comprise one or more hydroxyl groups, wherein the amount of cross-linking agent is added in order to provide a cross-linking ratio ranging from 1 to 25% of hydroxyl groups of the hydrophilic polymer.

5. Method according to claim 4, wherein the cross-linking agent is an organic acid anhydride, wherein the addition of the organic acid anhydride results in the cross-linking of the hydrophilic polymer by reacting with the hydroxyl groups.

6. Method according to claim 1, further comprising, after step d):
reducing a volume of the cross-linked mixture by at least 50% by removing the polar aprotic solvent; and
adding a further organic solvent to the reduced cross-linked mixture, wherein the further organic solvent has a boiling point that is lower than the boiling point of the polar aprotic solvent, wherein the further solvent has a boiling point lower than 100° C.

7. Method according to claim 1, further comprising, after step g), step h) of substantially removing the analyte from the deposited mixture.

8. Method according to claim 1, wherein the substrate is a conductive layer onto which the cross-linked mixture is deposited.

9. Method according to claim 8, further comprising, after step g), step h) of substantially removing the analyte from the deposited mixture, wherein the substantial removing of the analyte from the deposited mixture comprises placing the sensor electrode in an aqueous electrolyte solution, and applying a voltage of at least 0.5 V to the conducting substrate, wherein the voltage is given with respect to a Ag/AgCl reference electrode.

10. Method according to claim 1, wherein the solid substrate comprises a source and a drain contact, wherein the source and drain contacts are distanced from each other, wherein the source and drain are both in contact with the deposited cross-linked mixture thereby forming a semiconducting channel between the source and drain contacts, wherein the solid substrate further comprises a gate electrode configured to apply an electric field extending at least partially into the semiconducting channel.

11. Sensor electrode produced according to the method of claim 1.

12. Method of measuring an analyte concentration in an aqueous solution comprising:
 placing the sensor electrode of claim 11 in contact with an aqueous solution comprising the analyte;
 applying one or more voltages to the sensor electrode with respect to a further electrode;
 measuring one or more currents through the sensor electrode respectively at the applied one or more voltages;
 comparing the one or more currents to a reference current, wherein the reference current is a current measured at the respective voltage for the electrolyte substantially devoid of analyte; and
 calculating the analyte concentration based on the comparison of the current with the reference current.

13. Method according to claim 12, wherein the substrate is a conductive layer onto which the cross-linked mixture is deposited, wherein the further electrode is a reference electrode in contact with the electrolyte, wherein the current is measured between the sensor electrode and a counter electrode in contact with the electrolyte.

14. Method according to claim 12, wherein the substantial removing of the analyte from the deposited mixture comprises placing the sensor electrode in an aqueous electrolyte solution, and applying a voltage of at least 0.5 V to the conducting substrate, wherein the voltage is given with respect to a Ag/AgCl reference electrode, wherein the substrate is a conductive layer onto which the cross-linked mixture is deposited, wherein the further electrode is a reference electrode in contact with the electrolyte, wherein the current is measured between the sensor electrode and a counter electrode in contact with the electrolyte.

* * * * *